Aug. 23, 1932.  J. VAN ACKEREN  1,873,074
VERTICAL COKING RETORT OVEN AND METHOD OF OPERATING THE SAME
Filed Nov. 27, 1926    6 Sheets-Sheet 1

INVENTOR
Joseph van Ackeren
BY
Jesse R. Langley
ATTORNEY

Aug. 23, 1932.  J. VAN ACKEREN  1,873,074
VERTICAL COKING RETORT OVEN AND METHOD OF OPERATING THE SAME
Filed Nov. 27, 1926   6 Sheets-Sheet 4

INVENTOR
Joseph van Ackeren.
BY
Jesse R. Langley
ATTORNEY

Patented Aug. 23, 1932

1,873,074

UNITED STATES PATENT OFFICE

JOSEPH VAN ACKEREN, OF PITTSBURGH, PENNSYLVANIA, ASSIGNOR TO THE KOPPERS COMPANY, A CORPORATION OF PENNSYLVANIA

VERTICAL COKING RETORT OVEN AND METHOD OF OPERATING THE SAME

Application filed November 27, 1926. Serial No. 151,072.

My invention relates to vertical retorts, or coking retort ovens of the vertical type, and more particularly to combination vertical ovens embodying heating walls having vertical heating flues therein.

One object of my invention is to provide a system for heating vertical coking retort ovens wherein both primary and secondary combustion zones are co-operatively employed and yet the respective fuel gases and products of combustion thereof are conveyed separately thereto and therefrom, whereby the relative quantities of fuel supplied for the primary combustion and secondary combustion zones may be readily regulated by controlling the respective flow of the products of combustion.

A further object of my invention is to provide a heating wall having vertical flues in sections that are structurally and functionally substantially continuous but that are operatively separately controllable.

A further object of my invention is to provide a heating wall having substantially continuous vertical flues comprising upper and lower sections that are respectively provided with separate inlet and outlet means.

A further object of my invention is to provide means whereby the aforesaid separately conveyed products of combustion are commingled and equalized in temperature and flow before being distributed to the outflow regenerators.

A further object of my invention is to provide a structure for vertical coke ovens of the combination type, in which the heating walls are provided with vertical flues consisting of co-operating upper and lower sections in which each section may be alternatively supplied with rich or lean gas and with air and in which the products of combustion are separately conveyed from each of the flue sections.

A further object of my invention is to provide a coke oven battery with means whereby the temperatures of certain portions of a wall may be approximately equalized to prevent unequal expansion thereof when the battery is being initially heated.

A still further object of my invention is to provide a wall the sides of which are exposed to widely different temperatures with means whereby the temperature differential between one side and an intermediate portion thereof is relatively low whereby unequal expansion and the resultant fracture of one portion of the wall during the initial heating of the battery is prevented.

It has been proposed heretofore to provide heating walls of vertical coking retort ovens with flues in which primary and secondary combustion occur. In the operation of such flues, however, the products of the primary combustion were conveyed into the secondary combustion section, where they mixed with the fuel gases and products of secondary combustion and were withdrawn with the latter from such secondary combustion section.

While the construction set forth above had the advantages that the vertical flues were substantially continuous and that combustion might occur at different levels in the heating wall, regulation was somewhat limited and complicated by reason of the fact that the products of combustion of the primary combustion section mixed with the gases of combustion of the secondary section, rendering it necessary to regulate the amount of fuel directly and individually for each flue section rather than in common for each series of flue sections and indirectly through the flow of the products of combustion from such upper and lower series respectively in each heating wall.

My present invention is closely related to the subject matter of my copending application Serial No. 154,425, filed Dec. 13, 1926, Patent No. 1,846,410, and which constitutes an improvement upon the present invention.

In accordance with the present invention, I provide the heating walls with vertical heating flues having upper and lower sections that are in vertical alinement and with their inner ends closely adjacent each other, whereby the flues are substantially continuous from the standpoints of heating and structure. Each of the flue sections has its separate inlet means for alternatively supplying rich or lean gas and preheated air and, also, separate outlets for its products of combustion. The flue sections are, therefore, separate from an operating control standpoint.

Lean gas and air are supplied to the lower flue sections by ducts that are parallel to, and closely intermediate with, the upper flue sections. The products of combustion from the upper flue sections are conveyed to bottom horizontal flues by ducts that are in alinement with the aforesaid ducts for carrying lean gas and air and are substantially parallel to, and closely intermediate with, the lower flue sections. This close interweaving of such ducts with the flue sections further serves to unify co-operatively the upper and lower flue sections into a unitary heating wall, functioning as a series of substantially continuous vertical flues. Rich gas may be supplied from gas guns directly to each series of flue sections in each heating wall.

The products of combustion from the several primary combustion flue sections of each wall are conducted to a bottom horizontal flue below the heating flues, the products of combustion from the lower sections being conducted directly into a similar flue. Regulation of the relative quantities of fuel gas applied to the respective primary and secondary combustion sections may be readily effected by controlling the outlet opening of the horizontal flue for conveying the products of combustion of the secondary combustion sections.

An important feature of my invention resides in the fact that, although the products of combustion from several upper sections and lower sections are conveyed separately therefrom, they are united in a cross-around flue before being supplied in accordance with usual and well-known practice to an adjacent heating wall for upflow therein and then through the outflow regenerators. This uniting of the products of combustion insures the equalizing of the flow and the temperatures thereof and that waste gases of uniform flow and temperature are distributed equally through the heating flues and the regenerators of the co-operatively associated heating wall. Since the system of connections is symmetrical, the same results are secured upon reversal of flow. This arrangement insures that substantially equal amounts of waste gases pass through the respective outflow regenerators and their temperatures are therefore substantially the same.

The horizontal or intermediate brickwork is of improved construction and arrangement whereby connections are provided for each of the ducts for conveying lean gas and air to the lower flue sections, and for each of the upper flue sections to the ducts for conveying gases of combustion therefrom, and providing also a continuous horizontal section through which the conduit for rich gas extends.

A coke oven battery constructed in accordance with my invention is provided, also, with means whereby, during the initial heating of the battery to bring it up to operating temperature, an intermediate portion of a bulkhead or closing wall of the regenerators may be heated to substantially the same temperature as the inner side of the wall whereby unequal expansion between the intermediate portion and the inner surface is substantially prevented. Fractures of this portion of the wall are thereby avoided, together with the usual resultant leakages of air that may occur. Fractures in the outer portion of the wall may not be entirely prevented by this arrangement but such outer fractures are readily accessible for repair, and are not material if a unitary integral portion separates them from the interior of the battery.

My invention will be best understood by reference to the exemplification shown in the accompanying drawings, in which similar reference numerals are employed to designate corresponding parts.

Figures 1, 2:
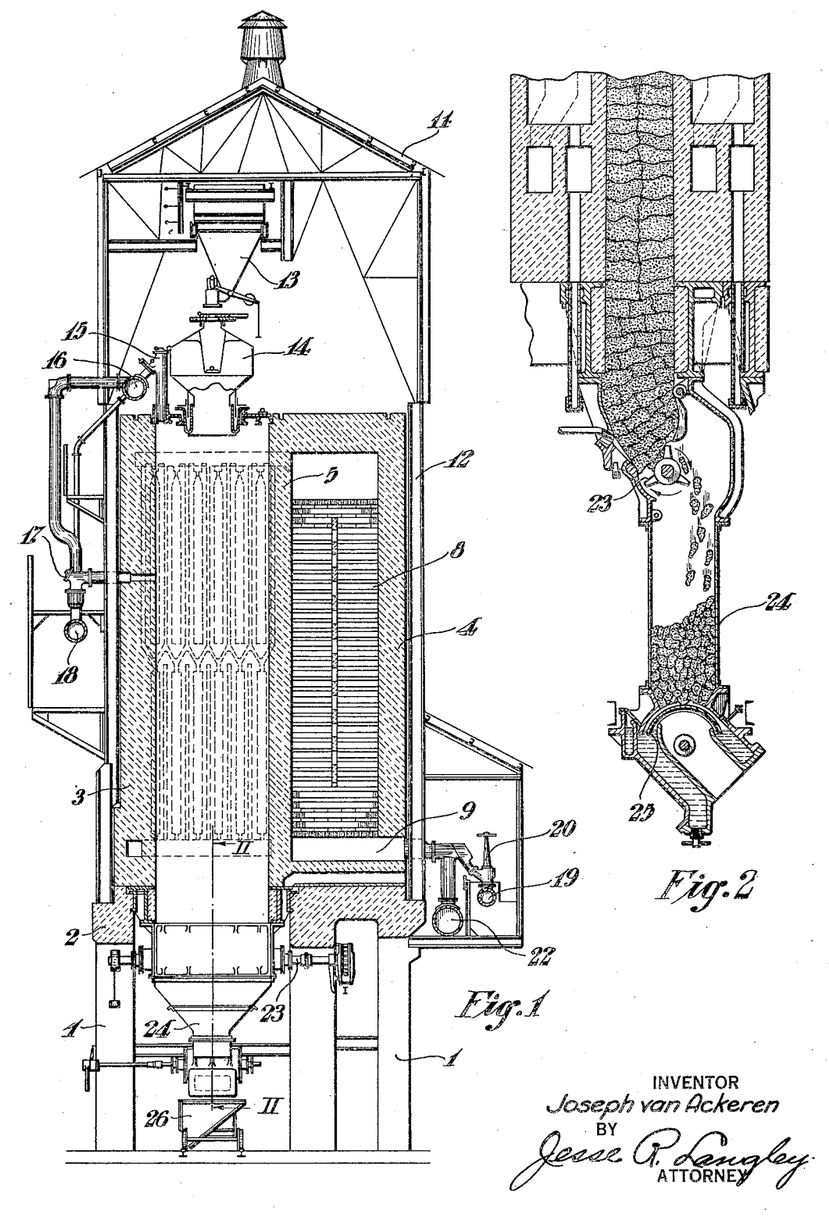
Figure 1 is a view, in vertical transverse section, of a vertical coke-oven battery constructed in accordance with my invention.
Fig. 2 is an enlarged sectional view of a portion of the structure of Fig. 1, taken on the line II—II.

Referring particularly to Fig. 1, a battery of vertical coking retort ovens of the continuous type comprises a framework 1, a foundation 2, and an oven structure comprising outer walls 3 and 4 and an inner wall 5. Extending between the walls 3 and 5 are a number of vertical coking retorts 6, through one of which the sectional view is taken, and also, the associated heating walls 7, one of which appears in this view. Regenerators 8, having sole channels 9, are located between the walls 4 and 5.

A super-structure 11, that is supported by framework 12, provides a support for a charging car 13 for supplying a coal magazine 14 that is located above the tops of the several retorts. A primary gas offtake 15 is located at the top of each retort of the battery and is connected to a primary collecting main 16. A secondary gas offtake 17, that is located below the top of each of the retorts for the purpose of discharging gas that is evolved at a lower level, is connected to a secondary collecting main 18. Producer gas, or other lean gas, is supplied through the sole channels 9 from a gas main 19 that is provided with regulating valves 20. A main 22 conducts waste gases to the stack.

Beneath the battery is located a power-driven coke extractor 23 for each of the retorts, the enlarged details of the extractor mechanism appearing more clearly in Fig. 2. Below the coke extractor is a coke magazine 24 that is provided with a water-sealed door 25 which controls the discharge of coke into a coke-receiving car 26.

Reference may now be had to Figs. 3, 4, 5 and 6, in which the structural details of the coke oven battery are illustrated. The coke oven battery may comprise any suitable or convenient number of retorts 6, which alternate with their associated heating walls 7. In the battery embodying my invention, five of such retorts are employed with their attendant six heating walls, but only certain of the retorts and heating walls are shown, inasmuch as the structural details thereof are substantially identical.

Each of the retorts 6 comprises a relatively narrow vertical passage of elongated cross-section tapering slightly between adjacent heating walls 7, the greater width being at the bottom in order to facilitate the flow of coal and coke downwardly therethrough.

Figure 5:
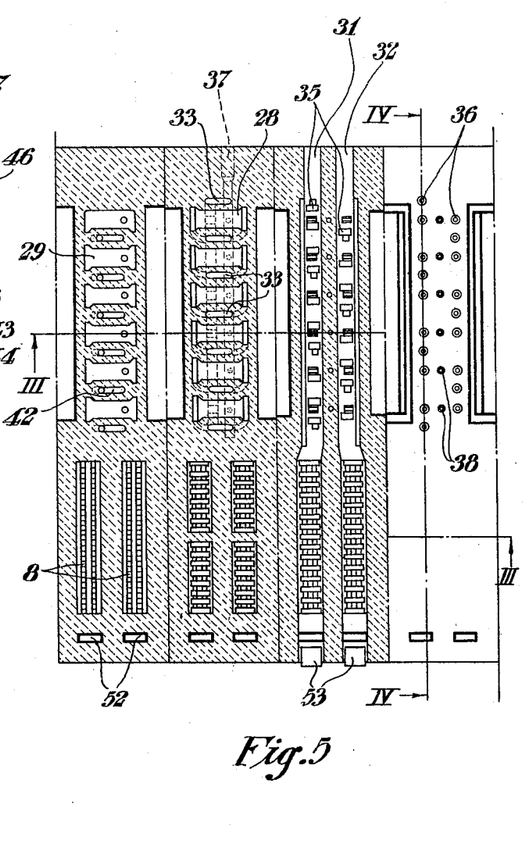
Fig. 5 is a horizontal sectional view taken on the line V—V of Fig. 3.

Each heating wall 7 is provided with vertical heating flues divided into upper sections 28 and lower sections 29 that are in vertical alinement and are sufficiently closely adjacent that each of the so-alined upper and lower sections together constitute a substantially continuous heating flue. The number of heating flues may be in accordance with the length of the wall, six being shown by way of example in the structure illustrated herein. As shown in Fig. 5, each of the heating flues is substantially rectangular in cross-section, the ends being slightly wider than the intermediate portion of the flue. The closely adjacent ends of the upper and the lower sections are formed by an intermediate or horizontal brickwork 30, the structural details of which will be later described.

The flue system of each of the heating walls 7 is operatively connected by means of horizontal flues 31 and 32 to two regenerators 8 of the usual checkerwork type that are located in extension of the corresponding heating wall. When producer gas is employed as a fuel, one of the horizontal flues conveys preheated gas and the other conveys preheated air to both the upper and the lower sections of the several heating flues of each wall in which gas is being burned. As will be noted in Figs. 3 and 4, each of the horizontal flues 31 and 32 is substantially directly connected through suitable ports to each of the upper sections 28. The horizontal flues 31 and 32 are connected to the lower sections 29 by means of ducts 33 that extend between and closely parallel the upper sections 28.

Figure 4:
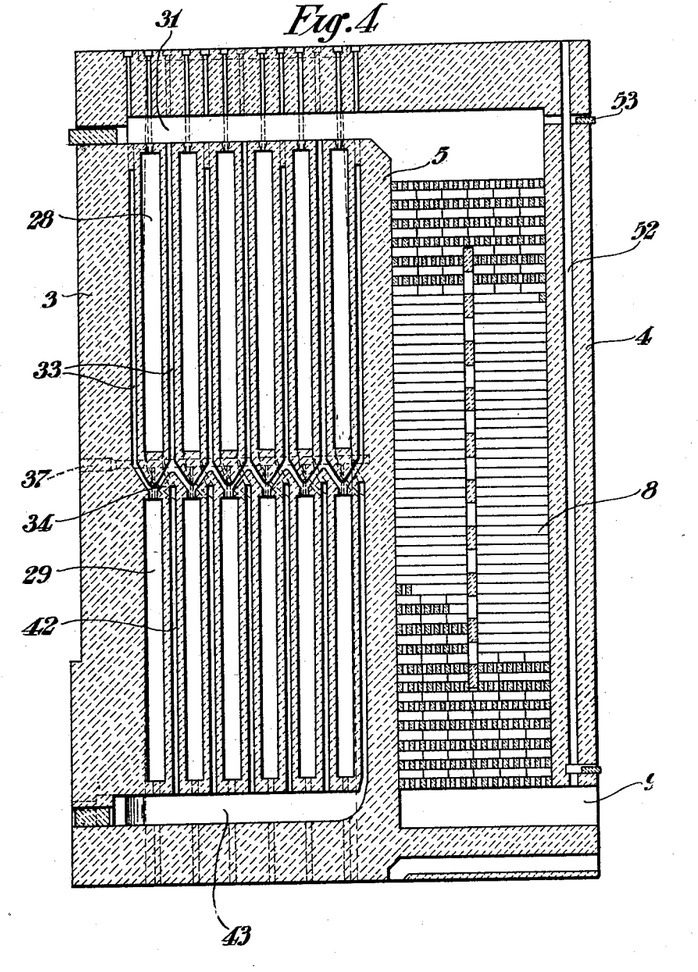
Fig. 4 is a sectional view, taken at right angles to that of Fig. 3 on the line IV—IV of Fig. 5.

Alternate ducts 33 are connected to the horizontal flue 31 and the other ducts 33 are connected to the horizontal flue 32. As is shown in Fig. 4, each of the ducts 33, except the end ones, have branches 34 connected to two of the lower sections 29, the branches 34 being located in the horizontal brickwork 30. By means of this arrangement, each of the lower sections may be supplied with fuel and preheated air by the employment of a minimum number of ducts 33.

Figure 3:
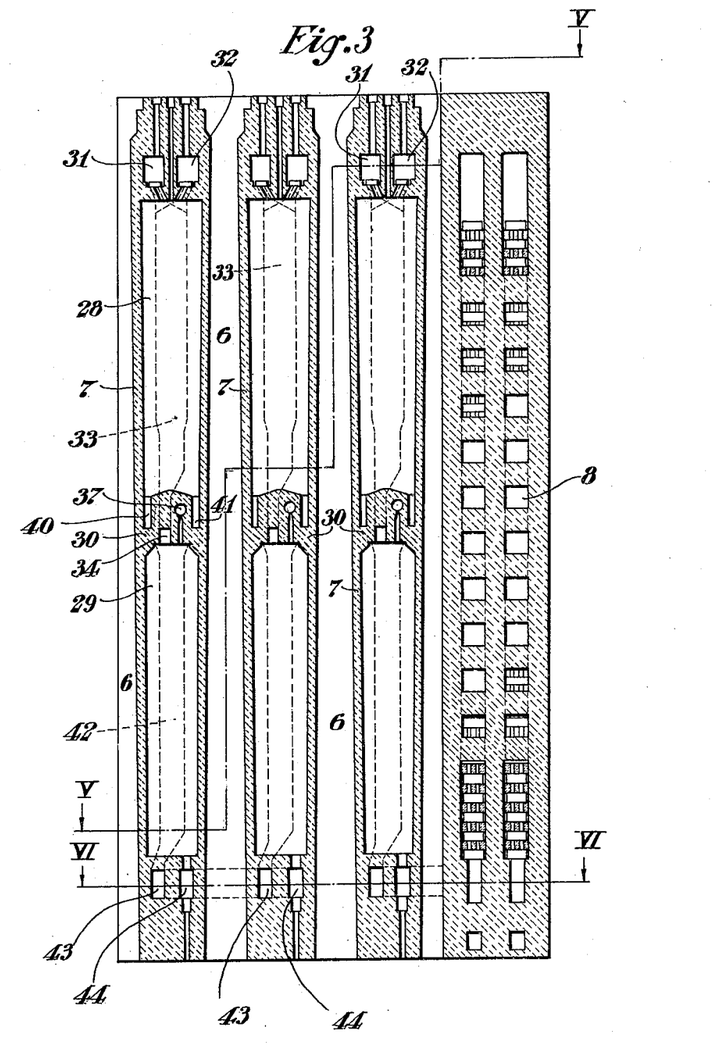
Fig. 3 is a sectional view of a portion of a vertical coke-oven battery, taken along the line III—III of Fig. 5.

Each of the openings leading from the horizontal flues to the upper sections 28 and to the ducts 33 is controlled by a sliding brick 35, certain of the sliding bricks appearing in Figs. 3 and 5. The positions of the sliding bricks 35 may be adjusted through openings 36 in the top of the corresponding wall 7.

Figure 8:
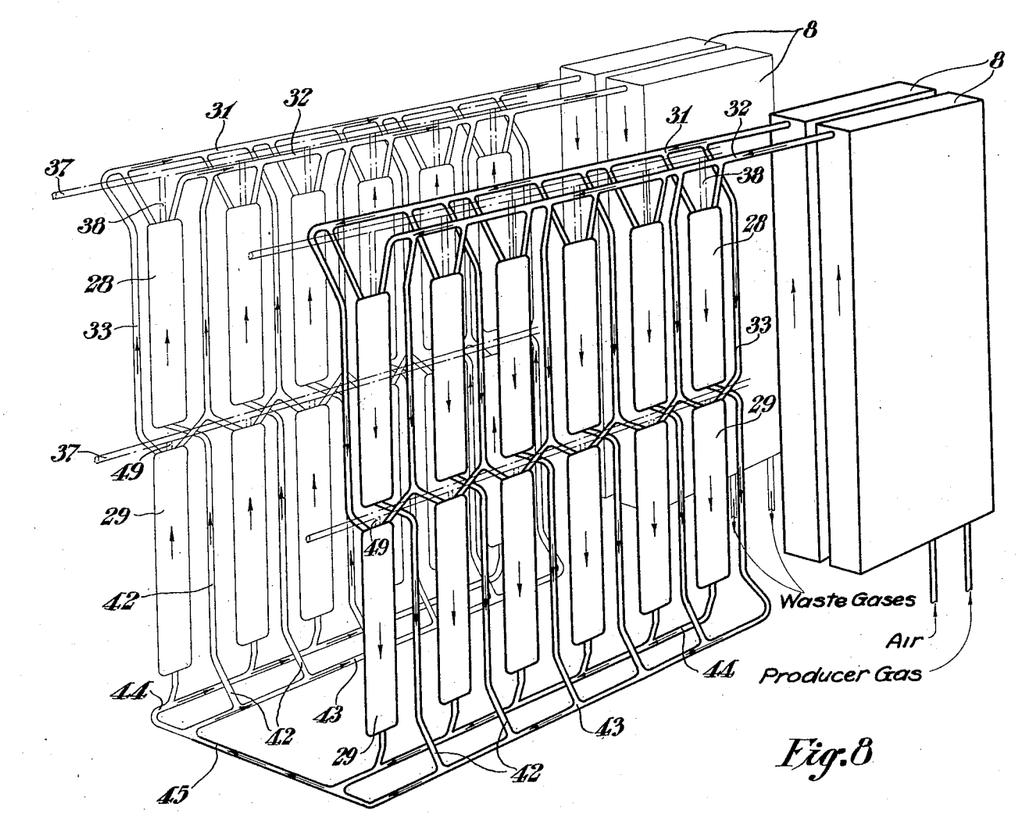
Figure 8 is a conventional flow-diagram for the vertical flues of two adjacent heating walls and for the means for supplying gas and air thereto and for conveying products of combustion therefrom.

In case coke oven gas or rich gas is employed as a fuel, it is supplied without preheating to each series of flue sections by means of a gas gun (not shown) and a horizontal distributing duct 37 of usual construction that is connected to the top portion of each of the flue sections. The horizontal duct 37 for supplying the lower flue sections extends through the horizontal brickwork 30. The horizontal duct 37 for supplying the upper flue sections, which is indicated in Fig. 8, is connected to vertical ducts 38 in the tops of the walls 7.

The products of combustion from the upper flue sections 28 are withdrawn from the bottom of each section through two rectangular ducts 40 and 41 that are closely adjacent to the sides of the heating wall and which are initially inclined to the right, as viewed in Fig. 4. The ducts 40 and 41 then turn in opposite directions through an angle of 90 degrees as they extend downwardly and join in a vertical duct 42, which extends between and closely parallels the lower flue sections 29 and is connected to a bottom horizontal flue 43.

The products of combustion from the lower flue sections 29 are withdrawn substantially directly through ducts in the bottom thereof into a second bottom horizontal flue 44 that is parallel to the bottom horizontal flue 43. The bottom horizontal flues 43 and 44, which extend substantially the entire length of the heating walls 7, extend into a portion of the wall 3, where they merge into a cross-around flue 45, which, as its name indicates, passes around the end of a retort 6 and is connected to similar bottom horizontal flues 43 and 44 of an adjacent heating wall 7.

Figure 6:
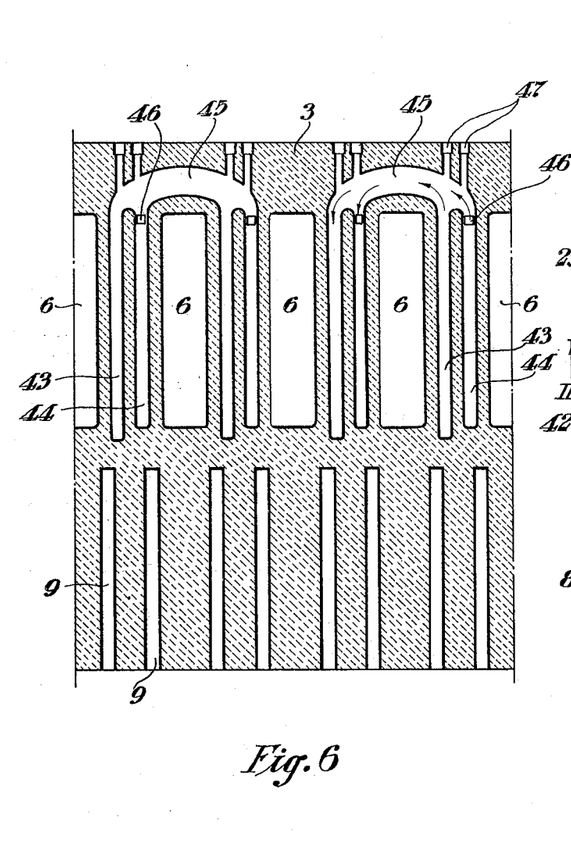
Fig. 6 is a similar view, taken along the line VI—VI of Fig. 3.

As best shown in Fig. 6, each of the bottom horizontal flues 44 is provided with a sliding brick 46 for regulating the relative quantities of gases flowing therethrough, openings 47 in the wall 3 providing access for this purpose.

Figure 7:
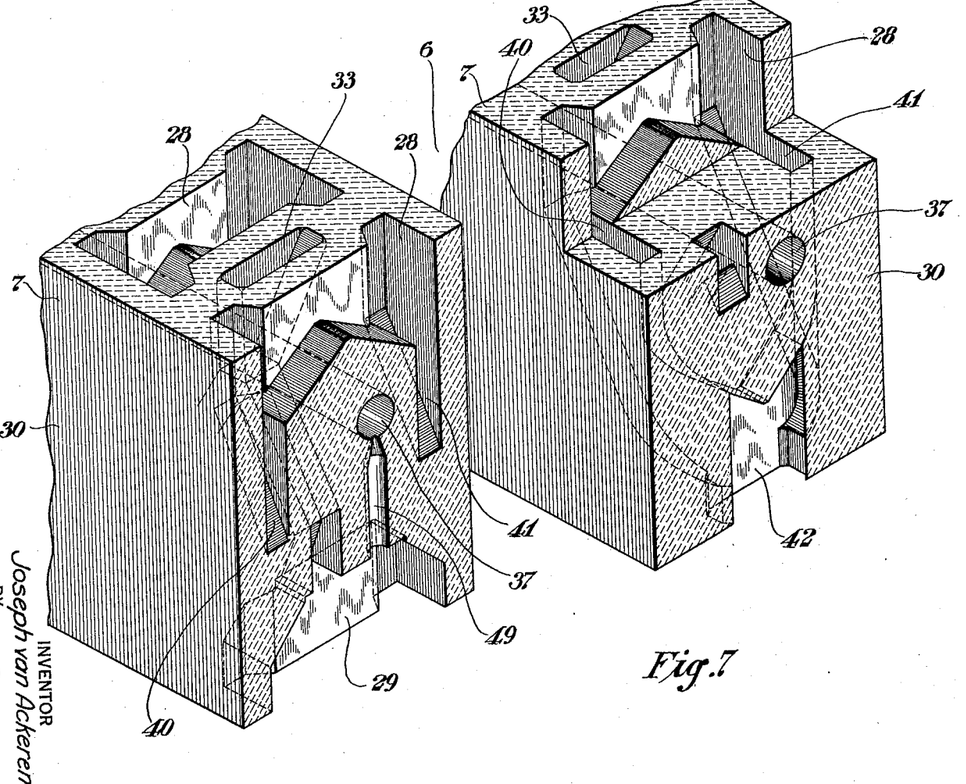
Fig. 7 is a sectional view, in perspective, of central portions of the intermediate brickwork of adjacent heating walls, at the substantially confluent ends of the upper and lower flue sections.

Reference may now be had to Fig. 7, which illustrates, in enlarged detail, the relations of the various flue sections and ducts in the intermediate junction brickwork 30. The view illustrates a portion of each of two adjacent heating walls that are spaced to provide a retort 6 therebetween.

It will be noted that the upper flue sections 28 are relatively closely adjacent, their intermediate portions being indented to provide space between them for the ducts 33 for supplying air and producer gas to the lower flue sections 29. Each flue section 28 is provided with the ducts 40 and 41 that are in substantial continuation of the outer sides of the flue sections that extend downwardly and longitudinally of the wall and, as previously stated, turn through an angle of 90° in opposite directions to merge into the vertical duct 42 for conveying products of combustion from the primary combustion sections 28.

It will be noted that the bottom portion of each flue section 28 is inclined toward the ducts 40 and 41 and that the top of the duct 42 is similarly inclined downwardly from the ducts 40 and 41 in order to facilitate the flow of gases through the several channels.

It will be observed that the lower ends of the ducts 33 are inclined toward one side thereof and are connected to branch ducts 34, which extend in each direction to supply air or producer gas to the adjacent lower flue sections 29. The arrangement of flue sections and ducts described above provides a continuous horizontal section through the intermediate brickwork 30 that is traversed by a horizontal duct 37, which is connected by a duct or nozzle 49 to each of the lower flue sections 29.

The vertically alined upper and lower flue sections 28 and 29 have their inner ends closely adjacent and, in addition, the ducts 40 and 41 extend close to the side walls of the heating wall and thereby substantially bridge the relatively small gap between the upper and lower flue sections, with the result that only a comparatively negligible portion of the surface of the heating wall is not directly heated from the interior by either of the flue sections or the ducts 40 and 41. Furthermore, the flame flue sections are continuously and closely paralleled by their intermediate ducts 33, conveying highly preheated air, or air and fuel gas, and ducts 42, conveying hot products of combustion, so that such interwoven ducts and flame flue sections constitute a unified heating wall formed of substantially continuous vertical heating flues.

The heating systems of one pair of operatively associated heating walls 7 are shown diagrammatically in the conventional flow diagram of Fig. 8. It will be understood that, in the interests of clearness, the relative positions of certain of the parts are inaccurately illustrated. In the operation of the heating systems for a pair of adjacent heating walls, it may be assumed, for example, that the connections are arranged for burning of gas or downflow in the flue sections of the nearer wall, as viewed in Fig. 8. It may be assumed, also, that, as indicated by arrows, the gases of combustion from the above-mentioned wall flow upwardly through the ducts and flues of the associated wall. The courses of the fuel and air and the resultant products will now be traced through the entire heating system of the associated walls.

Air and producer gas are admitted at the bottoms of the respective regenerators of the nearer heating wall and are preheated as they proceed upwardly through the open brickwork or checkerwork, the regenerators having been previously heated by waste gases flowing in the reverse direction. The preheated air enters the horizontal flue 32, from which it is distributed to the upper flue sections 28, where the primary combustion occurs. Air and producer gas are also conveyed by alternate vertical ducts 33 to the lower flue sections 29, where the secondary combustion occurs.

The products of combustion from the upper flue sections 28 pass downwardly through vertical ducts 42 into the lower horizontal flue 43, while the products of combustion from the lower flue sections 29 pass through openings in the bottoms thereof to the lower horizontal flue 44. The waste gases flow in the direction of the respective arrows into the cross-around flue 45, where the waste gases from the respective series of flue sections are commingled and their flow and temperatures are equalized to constitute a uniformly flowing mixture of substantially uniform temperature. The highly heated waste gases then pass into bottom horizontal flues 43 and 44 of the associated heating wall and are distributed by the ducts 42 and the connections to the lower flue sections 29 into the respective flue sections, from which they are conveyed by the vertical ducts 33 and the connections of the upper flue sections to the horizontal flues 31 and 32.

The waste gases are conveyed by the horizontal flues 31 and 32 in substantially equal quantities to the pair of regenerators 8 of the second wall and they pass downwardly therethrough to store heat therein. The waste gases, after leaving the regenerators are conveyed by any suitable means to the stack, not shown. At the end of a suitable period, the connections are reversed and air and gas are supplied to the farther wall and combustion occurs in its several flue sections and the products of combustion traveling in directions opposite the arrows are supplied to the flue sections of the nearer wall, from which they pass downwardly through the corresponding regenerators and to the stack in the manner previously described.

When coke-oven gas or rich gas is employed as a fuel, it is supplied substantially directly without preheating to the respective series of flue sections of one wall by the horizontal ducts 37. In this case, both regenerator chambers 8 of the wall in which combustion occurs are traversed by air which is accordingly supplied both by the usual air ducts and by the ducts employed for conveying producer gas when the latter is the fuel gas. The flow system is otherwise identical with that just described in connection with the employment of producer gas.

It will be appreciated that a greater quantity of gas may be required in the primary combustion sections than in the secondary combustion sections for the reason that the coal is comparatively cold when it is supplied to the upper portion of the battery while it has been brought to a comparatively high temperature before it reaches the portions of the walls heated by the lower sections 29. Also, the vertical ducts 42, which convey highly heated gases of combustion from the upper flue sections, traverse the lower portion of the wall and contribute materially to the heating thereof.

While a greater quantity of fuel may be consumed in the upper sections of the flues and a greater quantity of heat units are supplied to the upper portion of the heating wall, the lower portion of the retort is preferably maintained at a higher temperature than the upper portion in order that water gas may be made in the lower portion by the injection of suitable quantities of water. The yield of gas is thus considerably increased without materially affecting the quantity or the quality of the coke.

While the total amount of gas supplied to the wall may be controlled by the gas-regulating valves outside the battery, the distribution within the series of flue sections of the wall may be initially effected by the sliding bricks 35. However, in view of the number of openings, this method is inconvenient.

I have found that the relative amounts of gas supplied to the upper and the lower flue sections respectively may be regulated by a single sliding brick in the bottom horizontal flue 44, which conveys the waste gases of the secondary combustion sections. The variation of the degree of opening of this flue will determine the relative amounts of air and gas that are supplied to the upper and the lower flue sections respectively. When the directions of flow of fuel and gases are reversed, a corresponding sliding brick 46 in the bottom horizontal flue 44 of the associated wall is employed as the regulating means.

The operation of the heating systems has been described for one pair of heating walls. In a battery of five retorts, six heating walls are employed and they are connected in three pairs, each of which is similar to, and operates in the same manner as, the pair described above.

It may be assumed that the battery is in operation and that the heating systems of the several pairs of walls are operating in the manner described above to heat the several walls of the battery. It may be assumed further that coal is being supplied to the open top portions of the several retorts 6 from the coal magazine 14. The coal, which is permitted to move downwardly at a desired rate through the tapered retorts 6, gives up the greater portion of its volatile matter in the initial portion of its path. The evolved gases and smoke are collected at the top of the battery by the ascension pipe or gas offtake 15, from which they are conveyed to the collecting main 16 and thence to the by-product house for suitable treatment, not shown. Additional gases that are evolved at a lower depth in the retorts are collected by the secondary gas offtake 17, with which each retort is provided, and conveyed into the secondary collecting main 18.

When the coal reaches the lower portion of the retort, it is in the form of coke, as is clearly illustrated in Fig. 2. The coke is removed, after suitable quenching, by the coke extractor 23, which operates at such rate as to insure that the coal is completely coked during the period of its passage through the retort. The rotation of the coke extractor 23 in the direction of the arrows removes the coke gradually from the bottom of the column and it falls, as indicated, into the coke magazine 24. When the desired quantity accumulates in the magazine 24, the water-sealed door 25 is operated to discharge the contents into the coke-receiving car 26, which may be employed to convey it to any suitable place for shipment or storage.

In order to prevent cracking or fracture of the regenerator bulkhead or closing wall that separate them from the atmosphere when the battery is being heated initially to bring it up to operating temperature, I provide a vertical flue or by-pass 52 in the wall 4 corresponding to each regenerator. The hot gases that are employed to heat the interior of the battery are permitted to flow through the by-pass flues 52 and thereby equalize the expansion of the inner portion of the wall. This operation prevents fracture of the inner portion of the wall, since gases of substantially the same temperature are applied to both sides thereof. The outer exposed portion may fracture to some degree, but such condition is more or less immaterial provided the inner portion remains gas-tight. After the oven is brought to operating temperature, the by-pass flues 52 may be closed by sliding bricks 53, shown in Figs. 4 and 5, or filled with refractory material, since the operation of the flues 52 is no longer necessary.

It will be noted that I have provided a coke oven battery comprising vertical retorts with heating walls having heating systems that are highly efficient to perform their functions and that are of such construction and arrangement as to be easily and conveniently controlled. While the upper flue sections and the lower flue sections are separately supplied with fuel and the products of combustion are separately withdrawn therefrom, the corresponding flue sections constitute a substantially continuous flue for all practical purposes. The separate withdrawal of products of combustion has greatly simplified the regulation of the relative quantities of gas and air supplied to the respective series of sections, since it is only necessary to adjust the position of a single sliding brick when the flow is in one direction in a pair of heating walls.

I have also provided a construction for vertical ovens of the combination type wherein the ovens may be heated either by rich or lean gas and the transition from the one to the other may be easily and quickly made. The provision of a single cross-around flue for each pair of heating walls in which the relatively large quantity of products of combustion from the primary sections and the relatively small quantity from the secondary sections are united insures that substantially equal quantities of gases of uniform temperature are supplied to the outflow regenerators of the other heating wall of the pair. This result is very important since an unbalance of the temperatures of the regenerators results in inefficiency of the battery.

The foregoing and other advantages will be appreciated by those skilled in the art to which my invention appertains. It is conceivable that similar results may be secured by constructions and arrangements that are modifications of those described by way of example and that my invention may be variously otherwise embodied, and it is intended, therefore, that my invention shall not be limited except as expressed in the appended claims.

I claim as my invention:

1. In a coke oven, a heating wall comprising substantially continuous vertical heating means therefore, said means comprising superposed upper and lower vertical flame flues, upper and lower vertical passages adjacent to said flame flues, horizontal brickwork associated with the adjacent ends of said flame flues and passages in said brickwork for connecting the upper and the lower flame flues to the lower and the upper passages, respectively.

2. In a coke oven, a heating wall comprising two superposed vertical flame flues and horizontal brickwork associated with the adjacent ends of said flues, the upper flue having two curved passages extending from the bottom portion thereof through said brickwork and a vertical passage adjacent to the lower flue and connected to said curved passages.

3. In a coke oven, a heating wall comprising a system of superposed upper vertical flames flues and lower vertical flame flues, vertical passages alternating with the upper flues and the lower flues respectively, horizontal brickwork associated with the adjacent ends of said flues, said brickwork containing a curved duct for connecting each of said upper flues to a lower vertical passage and containing also two ducts for respectively connecting each of the upper vertical passages to two lower flues.

4. In a battery of vertical coking retort ovens, a plurality of vertical coking chambers and a plurality of heating walls alternately disposed therewith, each of said walls having a plurality of superposed upper and lower vertical flues that are closely adjacent, means for alternatively supplying rich gas and preheated air or preheated lean gas and preheated air to each of said flues, the supplying means comprising separate ducts for the different combustion media and means for conveying products of combustion separately from each of said flues.

5. In a coke-oven structure, a heating wall and a heating system therefor comprising a series of continuous vertical flues extending through the height of said heating wall and each having a combustion section adapted to receive combustible media at one end thereof, the combustion sections of certain of said flues being in the lower portion of said wall and the combustion sections of the other flues being in the upper portion of said wall, the upper ends of the lower combustion sections being closely adjacent to the lower ends of the upper combustion sections, whereby the entire heating wall is heated by combustion in said combustion sections or by hot gases therefrom.

6. In a coke oven, a coking chamber, a heating wall therefor for providing substantially continuous application of heat throughout the height of the said chamber, heating means in said wall comprising vertical flues extending throughout the height of said heating wall and having combustion sections in two superposed groups, means for supplying fuel to the top of each flue, and means including said flues for withdrawing products of combustion separately from the bottom of each of said combustion sections whereby hot gases traverse the entire height of said heating wall.

7. In a coke oven, the combination with a heating wall, of heating means therefor for providing substantially continuous vertical heating thereof and comprising vertical flues extending throughout the height of said heating wall and having combustion sections in closely adjacent upper and lower groups, fuel supply flues, waste-gas flues for conveying products of combustion and means for communicably connecting each of said vertical flues individually to one of said supply flues and to one of the waste-gas flues.

8. In a coke oven, the combination with two cooperating heating walls each having two separate groups of heating flues and means comprising two regenerators individual to the wall for supplying fuel to or receiving products of combustion from the heating flues of each of said walls, of means for regulating the relative quantities of fuel supplied to the respective groups of flues in one of said walls, and means for combining the products of combustion from both groups of said one wall for equal distribution to the heating flues and the regenerators of the other wall.

9. In a coke oven, the combination with two heating walls each having a heating system comprising two separate groups of flues and means comprising two regenerators individual to the wall for supplying fuel to or receiving waste gases from the heating flues of each of said walls, of means for varying the relative quantities of fuel supplied to the respective groups of one wall, and means for so connecting the heating systems of said walls that the products of combustion of the groups of flues of said one wall may be combined and flow through the heating system of the other wall and then be equally distributed between the regenerators of the latter wall.

10. The method of operating heating flues arranged in superposed rows in a heating wall, which comprises supplying fuel to each row of flues for combustion therein and withdrawing products of combustion from each row separately, and then combining the products of combustion from the respective rows to equalize their flow and temperatures for distribution to a second and similar heating wall.

11. In a coke oven, the combination with two heating walls each of which has heating flues in two superposed rows therein, of means for alternately supplying fuel and air to the flues of the respective walls, means for separately conveying products of combustion from each row of flues, and means for uniting the products of combustion from the respective rows of flues of one wall and conveying them for distribution to the flues of the other wall.

12. In a coke oven, the combination with two heating walls each of which has heating flues arranged in two superposed rows therein, the flues of one of said walls being communicably connected in series with the flues of the other wall of fuel supply connections to each of said flues, a flue for each row of heating flues for conveying products of combustion and the conveying flues being communicably connected to each of the heating flues of the respective rows and a flue for communicably connecting all of the conveying flues.

13. In a coke oven, the combination with two heating walls each of which has a plurality of heating flues arranged in two superposed rows, of means for supplying fuel to the flues of the one or the other of said walls, and a main passage for conveying products of combustion and connected in series with each row of flues and connecting the flues of one wall, in series with the flues of the other wall whereby, when fuel is burned in the flues of one wall, the products of combustion from the respective rows of flues thereof are first combined and then distributed to the several flues of the other wall.

14. The method of operating a coke oven in which adjacent heating walls each have heating flues in two superposed rows, which comprises supplying fuel and air to each of the flues of one wall for combustion therein, conveying separately the products of combustion from the respective rows of flues in said one wall, combining the separately conveyed products of combustion and then distributing them through the flues of the other wall.

15. The method of operating a coke oven in which co-operating heating walls have vertical flues arranged in separate superposed groups, which comprises separately supplying fuel to said groups for combustion therein, conveying separately the products of combustion from the respective groups of flues in one of said walls, equalizing the flow and temperatures of the aforesaid products of combustion and then distributing them through the flues in the other wall.

16. In a coke oven, the combination with two heating walls each of which is provided with a substantially continuous heating system comprising two superposed series of flame flues, of means for supplying fuel and air to the flues of the respective walls alternately, a horizontal flue for each series of flame flues and a single cross-around flue for connecting the horizontal flues of both walls.

17. In a coke oven, the combination with two heating walls each of which is provided with two superposed series of vertical flame flues, supply mains connected to the upper ends of said flame flues, horizontal flues for the respective series of flame flues of each of said walls, and connected to the lower ends of said flame flues, and a cross-around flue adapted for merging products of combustion from the horizontal flues of one wall to equalize the flow and temperatures thereof and from which said products may be distributed to the horizontal and vertical flues of the other wall.

18. In a coke oven, a heating wall provided with superposed series of vertical flame flues in vertical alinement, each of said flame flues having openings at the top and the bottom portions thereof, the lower openings of the upper flues communicating with vertical passages extending substantially parallel with the lower flues, a horizontal flue connected to said vertical passages, a second horizontal flue connected to the lower openings of the lower flame flues and a passage connected to both of said horizontal flues.

19. In a coke oven, a plurality of spaced heating walls, each having two superposed series of vertical flame flues in vertical alinement, each of said flues having openings at the top and the bottom portions thereof, the lower openings of the upper flues communicating with vertical passages extending substantially parallel with the lower flues, a horizontal flue connected to said vertical passages, a second horizontal flue connected to the lower openings of the lower flame flues and a passage communicably connecting the horizontal flues of each of said walls to the horizontal flues of the other of said walls and extending around the space between the walls of the pair.

20. In a coke oven structure, two elongated combustion compartments in alinement, each of said compartments having an opening adjacent the other compartment and said opening communicating with a passage that is substantially parallel with said other compartment but offset with respect to the one compartment.

21. In a coke oven, a heating wall having a plurality of upper and a plurality of lower vertical combustion compartments therein, two horizontal flues in the lower portion of said wall, said upper compartments being connected to one of said horizontal flues by vertical passages between the lower compartments, said lower compartments being connected to the other horizontal flue, and a flue for connecting said horizontal flues.

22. In a coke oven, the combination with a plurality of heating walls having upper and lower combustion compartments therein, of an extension for each of said walls, containing two regenerators that are communicably connected to each of the compartments in the wall, two passages connected to the upper and the lower compartments respectively of the wall, and a single passage for communicably connecting the first-named passages of pairs of said walls.

23. In a coke oven, the combination with a plurality of vertical heating walls having superposed rows of vertical compartments, of a horizontal extension for each of said walls containing two regenerators, means for connecting each of said two regenerators to each of the rows of compartments of the heating wall, two horizontal flues for each wall and connected to the rows of compartments respectively of the wall and a single flue for communicably connecting the horizontal flues of two walls.

24. In a coke oven, a heating wall comprising a system for substantially continuous heating of said wall, said system comprising upper and lower groups of vertical flues, the flues of said groups being alined and closely adjacent, said wall comprising also passages parallel and substantially co-extensive with the upper and the lower flues, respectively, each upper passage being connected at its lower end to a lower flue and each lower passage being connected at its upper end to an upper flue.

25. In a coke oven, two heating walls each having a plurality of heating flues therein in superposed rows, separate means for supplying fuel to said rows of flues and for conveying products of combustion therefrom and a conducting passage adapted for combining products of combustion from the several rows of flues from one of said walls to equalize the flow and temperatures of said products for distribution to the flues of the other wall.

26. In a coke-oven structure, a heating wall having an upper heating zone and a lower heating zone, and a heating system for said wall comprising a plurality of groups of continuous vertical flues extending through both of said zones, one group of said flues having combustion sections in the upper zone and a second group having combustion sections in the lower zone, each of said combustion sections being adapted to receive fuel gas and air at its upper end and the combustion sections in the lower zone being closely adjacent to the combustion sections in the upper zone whereby the heating effects of said combustion sections and of the flues carrying hot gases of combustion from the upper zone are substantially continuous between said zones.

27. In a coke oven, a coking chamber, a heating wall therefor for providing substantially continuous application of heat throughout the height of said coking chamber, heating means in said heating wall comprising vertical flues extending throughout the height thereof and having combustion sections in two adjacent superposed groups, means for supplying combustible media for flow in the same direction through all of said flues into said combustion sections, two passages for conveying products of combustion from the upper and the lower groups of combustion sections, respectively, and a single device for regulating the flow through one of said passages whereby the relative quantities of combustible media supplied to the respective groups is correspondingly regulated.

28. In a coke oven, a coking chamber, a heating wall therefor for providing substantially continuous application of heat throughout the height of said coking chamber, heating means in said heating wall comprising vertical flues extending throughout the height thereof and having combustion sections in two adjacent superposed groups, means for supplying combustible media to the tops of all of said flues for flow downwardly therethrough into said combustion sections and for the flow of gases of combustion to the bottom portion of said heating wall, two passages for conveying products of combustion from the upper and the lower groups of combustion sections, respectively, and a single device for regulating the flow in one of said passages whereby the relative quantities of combustible media supplied to the respective groups is corresponding regulated.

In testimony whereof, I have hereunto subscribed my name this 26th day of November, 1926.

JOSEPH van ACKEREN.